United States Patent
Leicht

(10) Patent No.: US 7,675,432 B2
(45) Date of Patent: Mar. 9, 2010

(54) LANE ASSIST SYSTEM FOR A MOTOR VEHICLE AND OPERATING METHOD

(75) Inventor: Holger Leicht, Heimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 105 days.

(21) Appl. No.: 10/577,212

(22) PCT Filed: Sep. 15, 2004

(86) PCT No.: PCT/EP2004/052177

§ 371 (c)(1), (2), (4) Date: Apr. 25, 2006

(87) PCT Pub. No.: WO2005/042300

PCT Pub. Date: May 12, 2005

(65) Prior Publication Data

US 2007/0043505 A1    Feb. 22, 2007

(30) Foreign Application Priority Data

Oct. 30, 2003  (DE) ................................. 103 50 779

(51) Int. Cl.
*G08G 1/16*   (2006.01)
(52) U.S. Cl. .................. 340/903; 340/435; 340/904
(58) Field of Classification Search .............. 340/901, 340/903, 904, 905, 576, 436, 937; 348/118, 348/169; 701/301
See application file for complete search history.

(56) References Cited

U.S. PATENT DOCUMENTS

| | | | | | |
|---|---|---|---|---|---|
| 3,902,687 | A | * | 9/1975 | Hightower | 244/185 |
| 4,918,438 | A | * | 4/1990 | Yamasaki | 340/7.58 |
| 5,745,034 | A | * | 4/1998 | Andersen et al. | 340/574 |
| 5,835,028 | A | * | 11/1998 | Bender et al. | 340/937 |
| 6,853,311 | B2 | * | 2/2005 | Taniguchi | 340/903 |
| 6,894,606 | B2 | * | 5/2005 | Forbes et al. | 340/435 |
| 7,266,220 | B2 | * | 9/2007 | Sato et al. | 382/104 |
| 2002/0176605 | A1 | * | 11/2002 | Stafsudd et al. | 382/106 |
| 2003/0169213 | A1 | * | 9/2003 | Spero | 345/7 |

FOREIGN PATENT DOCUMENTS

| | | |
|---|---|---|
| DE | 100 42 375 | 5/2002 |
| FR | 2 828 154 | 2/2003 |
| JP | 2000 225877 | 1/2001 |
| JP | 2001 199296 | 5/2001 |

* cited by examiner

*Primary Examiner*—Brent Swarthout
(74) *Attorney, Agent, or Firm*—Kenyon & Kenyon LLP

(57) ABSTRACT

In order to provide a lane assist system for a motor vehicle including a surround sensor device, which is mounted on the vehicle, for detecting the lane of the vehicle and a warning device to alert the driver in the event of the vehicle threatening to depart the lane which, with the smallest possible disturbance of the passengers, still enables the driver to initiate an intuitive steering response in a danger situation, it is provided to design and set up the warning device in such a way that a vibration, noticeable to the driver, is generated in the driver seat, to the effect that the vibration is noticeable on the side on which a lane departure threatens or actually takes place.

9 Claims, 1 Drawing Sheet

LANE ASSIST SYSTEM FOR A MOTOR VEHICLE AND OPERATING METHOD

FIELD OF THE INVENTION

The present invention relates to a lane assist system for a motor vehicle including a surround sensor device, which is mounted on the motor vehicle, for detecting the vehicle's lane and a warning device for alerting the driver in the event of the vehicle threatening to depart the lane. The present invention also relates to a method for operating such a lane assist system.

BACKGROUND INFORMATION

In a lane assist system of the above-mentioned type, the lane ahead or beneath the vehicle is detected by a surround sensor. If the vehicle threatens to depart the lane to the right or the left, an acoustic, a visual and/or a haptic warning is output to the driver.

Another possible application of a lane assist system of the above-mentioned type arises when driving on a multi-lane roadway when the driver intends to depart the right lane and change over to the middle lane or the left lane in order to pass a slower moving vehicle traveling ahead. If, at the beginning of the steering process, the surround sensor detects a vehicle rapidly approaching from the rear, the driver is prompted by an acoustic, visual and/or haptic warning to abort the lane change operation.

The lane assist system typically has a sensor system which is made up of a two-dimensional sensor array or only one or a few sensor row(s). As a rule, the sensor system is mounted on the vehicle's front, pointing ahead, and scans a certain roadway section in the vehicle's surroundings. The obtained image information is analogously or digitally processed using known technologies in order to extract information about the roadway markings and the roadway edge. In the event of the vehicle threatening to depart the current lane under danger, the warning device outputs an acoustic, visual and/or haptic alert.

An acoustic alert, for example, may be output in the form of a sound, known as a spike strip rattling sound, specifically on the vehicle side on which the vehicle threatens to depart the lane. Such a spike strip rattling sound acoustically simulates the crossing of a roadway marking provided with spikes or a profile. As a response to this sound, the driver may for the most part intuitively very quickly carry out a suitable steering correction. However, such an acoustic alert has the disadvantage that the other vehicle passengers are often intensely disturbed and unsettled.

In the case of a haptic alert, e.g., vibration of the steering wheel, the disturbance of the other vehicle passengers is avoided, but such a vibration alert is not direction-specific, so that the driver is not able to carry out an intuitive targeted steering correction. Rather, the driver, alarmed by the alert, must initially visually comprehend the instantaneous situation and then initiate an appropriate response. As a result, valuable split seconds are often lost, particularly in critical traffic situations.

SUMMARY OF THE INVENTION

The warning device is characteristically designed and set up in such a way that it provides the driver with a haptic indication of direction, i.e., information about the direction in which there is the risk of the perilous lane departure. In this manner, disturbance of the other vehicle passengers due to acoustic signals may be avoided while preserving the direction information in the warning signal. The driver may thus, in any event after a short adaptation phase, intuitively counter-steer to the perilous lane change.

It is advantageous that the warning device has a vibration device, which cooperates with the driver seat, for generating haptic feedback for the driver by vibrating the driver seat, the vibration device being designed in such a way that vibrations may be generated on at least two sides of the seat surface, independently of one another.

A secondary warning device for outputting a visual and/or an acoustic warning signal is advantageously provided in addition to the vibration device. Therefore, another different warning signal may be output in the event that the haptic alert is ignored or remains ineffective. Disturbances of the passengers are thus reduced to a degree unavoidable for the safety of the vehicle passengers.

The vibration device, which cooperates with the driver seat, may advantageously be made up of two vibration elements which are mounted on the left side and the right side of the seat and which may be activated separately and are permanently integrated into the seat. In another embodiment, a vibration mat is provided which is modified in such a way that the vibration elements right and left are able to be separately activated.

The motor vehicle's surround sensor device may advantageously have a sensor, which cooperates with the warning device, for detecting vehicles approaching from the rear and for outputting an alert if, during a change to a new lane, a vehicle rapidly approaches from the rear on the new lane.

The motor vehicle's surround sensor device appropriately contains a radar sensor, an ultrasound sensor, or an image recording camera in particular.

According to the present invention, in a method for operating such a lane assist system, the vehicle's lane is detected, it is judged whether the vehicle threatens to depart the lane under danger, and a warning signal is generated for the driver when the vehicle threatens to depart the lane under danger, the warning signal characteristically providing the driver with acoustic or haptic feedback which contains information about the direction in which there is the risk of the perilous lane departure.

DETAILED DESCRIPTION

Figure 1:
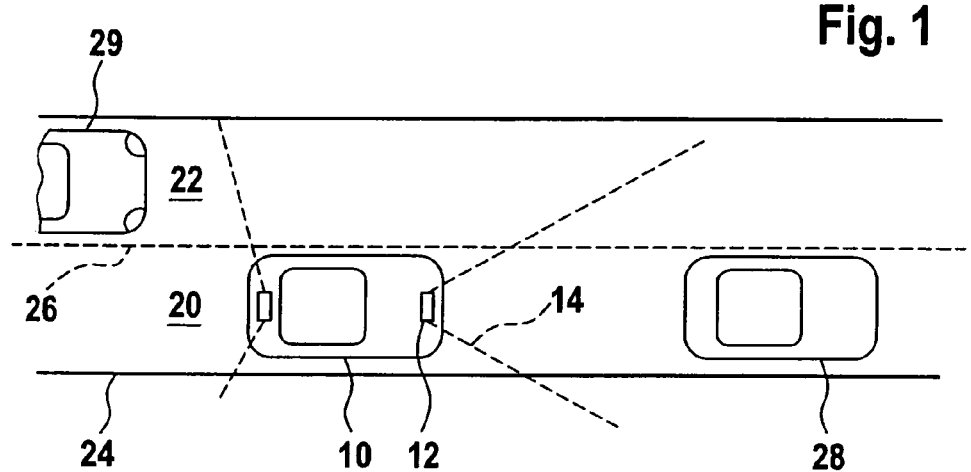
FIG. 1 shows a schematic representation of a motor vehicle on a two-lane roadway having a lane assist system according to an exemplary embodiment of the present invention.

FIG. 1 shows a lane assist system according to an exemplary embodiment of the present invention including a schematic representation of a motor vehicle 10 on a two-lane roadway 20, 22. The lane assist system includes a surround sensor device 31 (FIG. 2) which, in the exemplary embodiment, contains a forward pointing front sensor 12, which is mounted on the vehicle's front section, and a backward pointing rear sensor 16 which is mounted on the vehicle's rear section.

Visual field 14 of front sensor 12 detects right roadway edge 24 of right lane 20 and roadway marking 26 which divides lanes 20 and 22. A computing unit of the lane assist system, a micro processor for example, determines the position of vehicle 10 relative to lane 20 from the collected sensor data.

Visual field 18 of rear sensor 16 covers the rear area of vehicle 10 in order to detect vehicles 29 approaching from the rear.

If vehicle 10 threatens to cross roadway edge 24 and to depart lane 20 to the right, for instance due to a distraction or the overfatigue of the driver, the driver is alerted by the below-described warning and enabled to initiate counter measures. In an embodiment, the latter could also be an automatic intervention in the vehicle's steering system. The warning is implemented by the fact that a warning signal is generated and a vibration unit, which receives the warning signals, generates control signals true to side for the respective element(s) in the driver seat. This prompts the driver to steer again to the left and to abort the lane change operation. An acoustic and/or visual warning signal may additionally also be output here.

An acoustic warning signal may also be output when the driver does not respond to the haptic warning and a lane departure continues to be a threat or actually takes place. Due to the fact that, in the exemplary embodiment, the acoustic warning is only output when the haptic warning is not registered or other certain conditions are met (e.g., hands not on the steering wheel, or similar), disturbances of the passengers are reduced to a degree unavoidable for the safety of the vehicle passengers.

Due to rear sensor 16, which may be omitted in an advantageous embodiment, lane assist system 30 may also be used as an auxiliary device for lane changes, if, for instance, the driver of vehicle 10 intends to depart right lane 20 and change to left lane 22 in order to pass a slower moving vehicle 28 traveling ahead. If, at the beginning of the steering operation, rear sensor 16 detects a vehicle 29 rapidly approaching from behind on lane 22, warning signals are output to the vibration device which subsequently generates control signals true to side for the respective element(s) in the driver seat. This prompts the driver to steer again to the right and to abort the lane change operation. An acoustic warning signal may additionally be output here.

Figure 2:
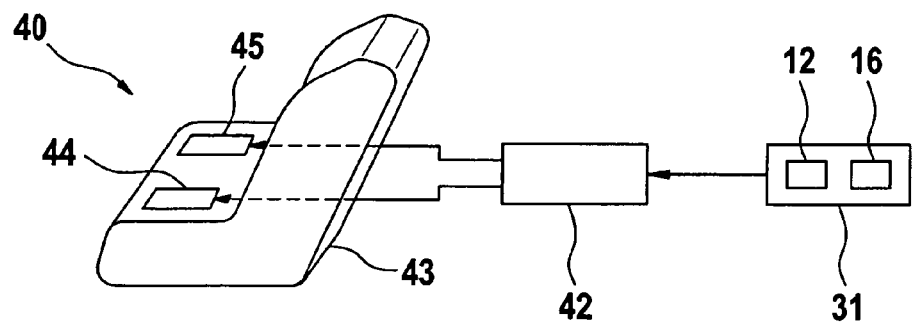
FIG. 2 shows a schematic representation of a lane assist system according to another exemplary embodiment of the present invention in which vibrations of the driver seat indicate the direction of a perilous lane departure.

This approach is illustrated in FIG. 2. Surround sensor device 31 or a processing unit, which analyzes the signals of this sensor device, determines whether and on which vehicle side a lane departure is threatened. An appropriate signal is generated and output to a warning unit 42 which may be part of the processing unit. Vibration elements 44 and 45, which are able to be activated separately from warning unit 42, are installed in the driver seat. As a function of the supplied signal, warning unit 42 activates the right vibration element (in the event of a lane departure to the right) or the left vibration element (in the event of lane departure to the left) which generates a vibrating motion, thereby prompting the driver true to side to execute the required steering correction. The vibration elements are integrated into the seat and situated in such a way that a noticeable vibration is created on part of the seating surface (on the left part in the case of the left vibration element and on the right part in the case of the right vibration element). In another embodiment, a vibration mat is used in the driver seat underneath the seating surface which is designed in such a way that its left and right side are able to be activated separately.

While the present invention is shown and described in particular with regard to preferred exemplary embodiments, it shall be understood by those skilled in the art that design and detail modifications may be made without deviating from the idea and the scope of the present invention. In a simpler and more cost-effective embodiment, surround sensor device 31 may contain only one sensor 12, for example.

What is claimed is:

1. A lane assist system for a motor vehicle, comprising:
    a surround sensor device, which is mounted on the vehicle, for detecting a lane of the vehicle; and
    a device for alerting a driver of the vehicle in the event that the vehicle at least one of (a) threatens to depart the lane and (b) actually departs the lane, the device being adapted to cause a vibration, noticeable to the driver, in a driver seat on a side of a seating surface on which a lane departure at least one of (a) threatens and (b) is taking place, the vibration being produced by a vibration mat underneath the seating surface of the driver seat, the vibration mat being adapted to be activated separately for the left and right side;
    wherein:
        the surround sensor device includes a sensor for detecting vehicles approaching from a rear;
        if it is detected, during a change to a new lane, that a vehicle is rapidly approaching from the rear on the new lane, the lane assist system outputs a warning;
        the surround sensor device includes a sensor for detecting a roadway edge; and
        in the event that the vehicle at least one of (a) threatens to cross the roadway edge and (b) actually crosses the roadway edge, the lane assist system is configured to automatically intervene in a steering system of the vehicle.

2. The lane assist system according to claim 1, wherein the device outputs control signals for the vibration mat.

3. The lane assist system according to claim 2, wherein the vibration mat is integrated into the driver seat in such a way that the vibration is noticeable on the seating surface of the seat.

4. The lane assist system according to claim 1, further comprising a secondary warning device for outputting at least one of a visual and an acoustic warning signal.

5. A method for operating a lane assist system for a motor vehicle, the method comprising:
    detecting, via a sensor, whether a vehicle is rapidly approaching from a rear;
    generating a warning for a driver of the vehicle if it is detected, during a change to a new lane, that a vehicle is rapidly approaching from the rear on the new lane, wherein generating the warning includes a processor outputting a signal to a vibration unit for generating a vibration, noticeable to the driver, in a driver seat on a side of a seating surface corresponding to a direction of the change to the new lane, the vibration being produced by a vibration mat underneath the seating surface of the driver seat, the vibration mat being adapted to be activated separately for the left and right side;
    detecting, via the processor and based on sensor signals, a roadway edge; and
    intervening automatically, by the processor, in a steering system of the vehicle in the event that the vehicle at least one of (a) threatens to cross the roadway edge and (b) actually crosses the roadway edge.

6. The lane assist system according to claim 1, wherein the device for alerting the driver causes a vibration, on a side of the seating surface corresponding to a direction of the change to the new lane, as the warning.

7. A lane assist system for a motor vehicle, comprising:
    a surroundings sensor device mounted on the vehicle and adapted for sensing a lane of the vehicle; and
    a device adapted for:

warning a driver of the vehicle when the vehicle at least one of (a) threatens to depart the lane and (b) is departing the lane, the warning being performed by generating a vibration, noticeable to the driver, in a driver seat on a side of a seating surface at which the departure threatens to take place or is taking place; and outputting at least one of an audible warning signal and a visual warning signal conditional upon a determination that the driver has not reacted to the vibration and the vehicle continues to depart the lane or threaten to depart the lane.

8. The lane assist system according to claim 7, wherein the device is adapted to output an acoustic signal simultaneously with the vibration.

9. A method for operating a lane assist system for a motor vehicle, the method comprising:

sensing a lane of the vehicle by a surroundings sensor mounted on the vehicle;

warning a driver of the vehicle when the vehicle at least one of (a) threatens to depart the lane and (b) is departing the lane, the warning being performed by a processor outputting a signal to a vibration unit for generating a vibration, noticeable to the driver, in a driver seat on a side of a seating surface at which the departure threatens to take place or is taking place; and outputting by the processor a signal for generating at least one of an audible warning signal and a visual warning signal conditional upon a determination that the driver has not reacted to the vibration and the vehicle continues to depart the lane or threaten to depart the lane.

* * * * *